Sept. 25, 1951     W. R. PETERSON ET AL     2,569,191
WAGON UNLOADING ATTACHMENT FOR PNEUMATIC ELEVATORS
Filed Oct. 22, 1947     3 Sheets-Sheet 1

INVENTORS
Walter R. Peterson
and Erwin R. Johnson
Paul O. Pippel
Atty.

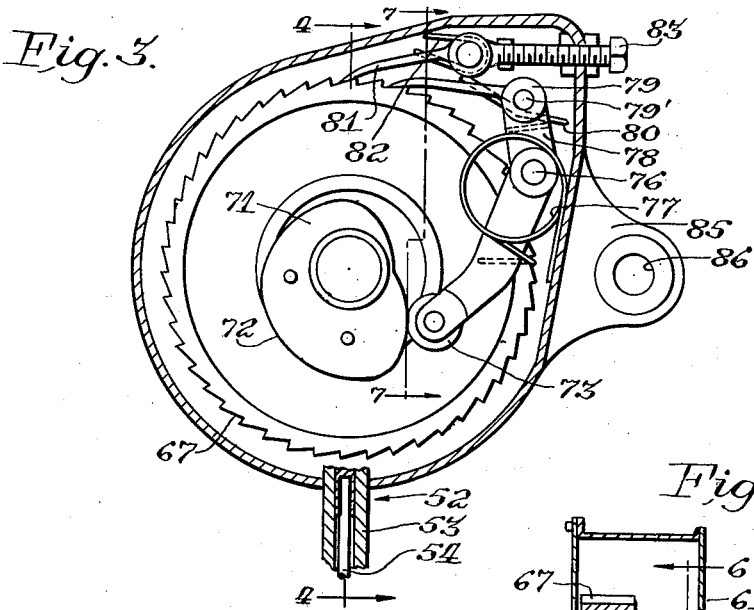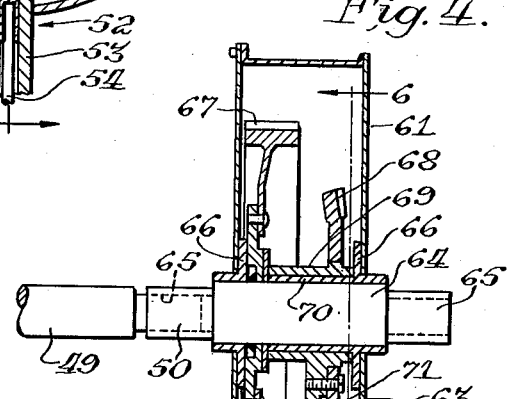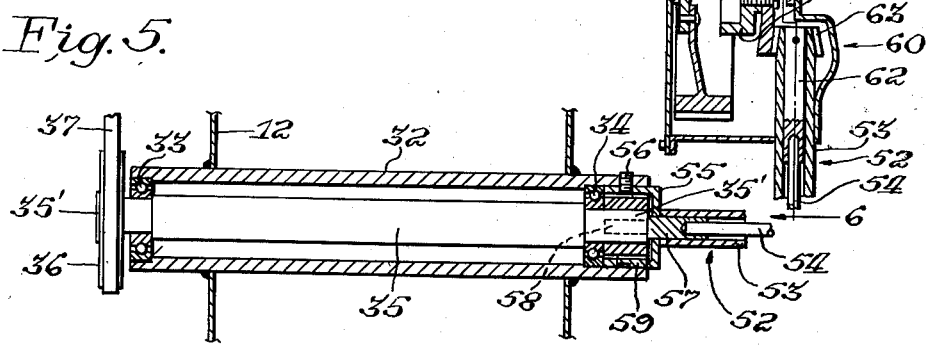

Sept. 25, 1951　　W. R. PETERSON ET AL　　2,569,191
WAGON UNLOADING ATTACHMENT FOR PNEUMATIC ELEVATORS
Filed Oct. 22, 1947　　　　　　　　　　　　3 Sheets-Sheet 3

INVENTORS
Walter R. Peterson
and Erwin R. Johnson

Patented Sept. 25, 1951

2,569,191

UNITED STATES PATENT OFFICE 2,569,191

WAGON UNLOADING ATTACHMENT FOR PNEUMATIC ELEVATORS

Walter R. Peterson, Hinsdale, Ill., and Erwin R. Johnson, Ames, Iowa, assignors to International Harvester Company, a corporation of New Jersey Application October 22, 1947, Serial No. 781,452

2 Claims. (Cl. 214—83.28)

1

This invention relates to a material handling mechanism and particularly to a material handling elevator of the blower type. More specifically, this invention relates to a novel mechanism for unloading material from a wheeled vehicle by utilizing power means located on a pneumatic elevator.

The type of material handling mechanism or elevator with which the present invention is concerned is well known in the art as a pneumatic elevating device or blower. A blower generally includes a housing having a rotating fan to which is connected a discharge pipe which generally extends upwardly for delivery to a silo or farm structure to which the material is to be delivered. A chute or conveyor generally forms part of the blower structure and is utilized for the purpose of delivering or transporting material to the fan of the blower. In order to fill up a silo, therefore, the material must be first delivered to the conveyor of the blower and generally a farm truck or wagon is utilized for this purpose. The greatest difficulty has been found in the operation of transferring the material from the wagon to the conveyor of the blower. A dump truck was found to be unsatisfactory since the position of the conveyor could not be conveniently arranged at a low enough height to accommodate the dumping action of the truck. The expense of a dump truck, therefore, plus the uneven discharge of a unit of this type made this construction unsatisfactory. The manual unloading of material from a wagon, is of course, also unsatisfactory and the tedious effort necessitated by such unloading can quickly be appreciated. Applicant has devised a novel, efficient and inexpensive construction for unloading material from a wheeled vehicle onto the conveyor of a blower elevator. A prime object, therefore, is to provide a novel unloading mechanism for discharging material from a mobile vehicle to a material handling mechanism.

Still another object is to provide a material handling or treating mechanism having flexible power drive means arranged to unload a wheeled vehicle which is arranged adjacent the material treating means.

A further object is to provide a material handling mechanism including a wagon or wheeled vehicle having a movable apron thereon, said movable apron being arranged to move and discharge material from said wagon by the utilization of power means connected to the material handling drive mechanism.

A still further object is to provide an elevating mechanism and a wheeled vehicle arranged to discharge material to said elevating mechanism, the means for discharging said material including a flexible drive shaft structure which is arranged to be driven by the elevating mechanism.

2

A still further object is the provision of an elevating or material handling means having a flexible drive structure constructed to be quickly attached to a wheeled vehicle and to effectuate the discharge of material of said vehicle to the elevating means.

Other objects of this invention will become more readily apparent from an examination of the specification when read in conjunction with the accompanying drawings.

In the drawings:

Fig. 3 is a sectional view taken along the line 3—3 of Fig. 1 showing a rotary drive unit for actuating the unloading device of a wheeled vehicle;

Fig. 4 is a sectional view of the rotary drive unit taken along the line 4—4 of Fig. 3;

Fig. 5 is a sectional view taken along the line 5—5 of Fig. 2, said view showing a portion of a power take-off drive element of the material handling mechanism;

Figure 1:
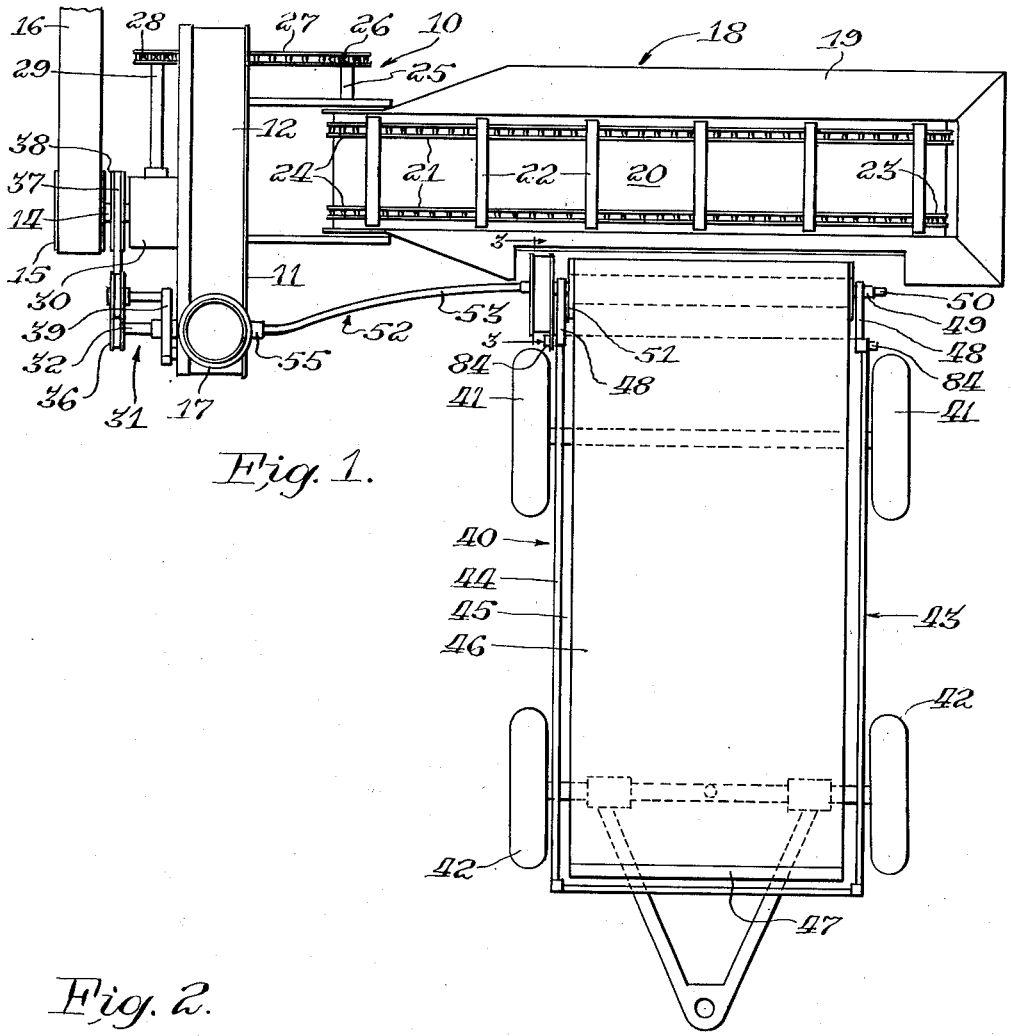
Fig. 1 is a plan view of the invention illustrating a material handling mechanism having novel drive means for unloading a wheeled vehicle which is postiioned adjacent to said material handling mechanism.
Figure 2:
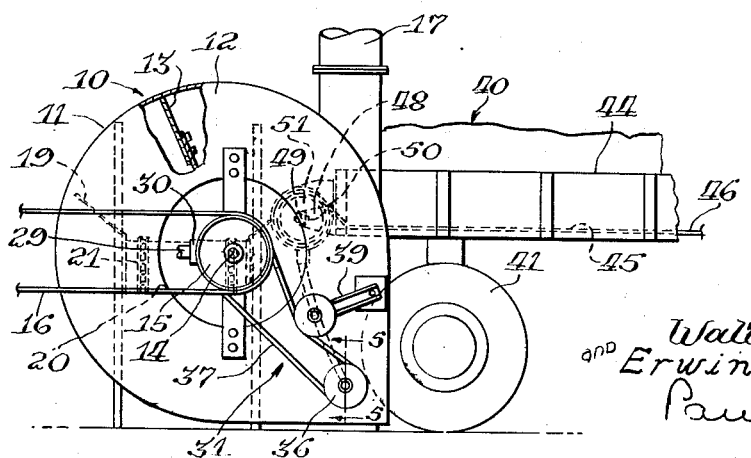
Fig. 2 is an end elevational view of the mechanism shown in Fig. 1.
Figure 6:
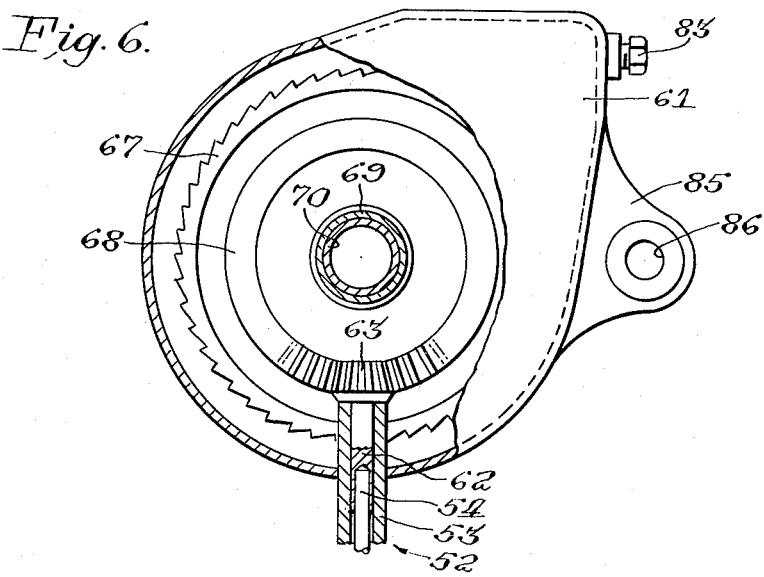
Fig. 6 is a sectional view through the rotary drive unit taken along the line 6—6 of Fig. 4.

Referring generally to Figs. 1 and 2, a material handling mechanism is generally indicated by the reference character 10. The material handling mechanism 10 consists of a pneumatic elevator or blower 11 having a blower housing 12. The blower housing 12 includes a blower fan 13 which is mounted for rotation on a shaft 14. The shaft 14 is provided at one end, and is driven by a pulley 15. The pulley 15 is in turn driven by a belt 16 which may be suitably driven by a stationary power unit, not shown, or the pulley of a tractor. Rotation of the fan 13 causes the material within the housing 12 to be discharged through the vertical conduit 17. The vertical conduit 17 is of conventional type and usually has extensions, not shown, which provide means by which the material may be delivered to the upper end of a silo or barn.

A conveyor 18 is positioned at a right angle with respect to the blower housing 12. The conveyor 18 includes a trough 19 having a bottom 20. A pair of endless chains 21 are free to move longitudinally with respect to the bottom 20 and are connected by means of transversely extending slat members 22. The chains 21 extend over rear sprockets 23. The forward portion of the conveyor 18 is provided with a pair of forward sprockets 24 which are secured in driving engagement with a shaft 25. The shaft 25 is rotated by means of a sprocket 26 which is driven by a chain 27 in turn connected to a drive sprocket 28. A shaft 29 drives the sprocket 28, said shaft extending into a gear housing 30 having a conventional type of worm gear reduction mechanism (not shown) which is driven by the shaft 14.

A power take-off drive mechanism is generally indicated by the reference character 31. The power take-off drive mechanism 31 includes a transversely extending tubular member 32 which is rigidly supported on and secured between the sides of the blower housing 12. A pair of ball bearing members 33 and 34 are transversely spaced and supported by the tubular member 32. A shaft 35 having undercut end portions 35' is journalled on the bearings 33 and 34. The shaft 35 has secured thereto a pulley 36. The pulley 36 is rotated by means of a belt 37 which in turn is connected to a drive pulley 38 which is secured to the shaft 14. A belt tightener pulley 39 suitably adjusts the belt 37.

As best shown in Figs. 1 and 2, a mobile platform or wheeled vehicle 40 is positioned adjacent the conveyor 18. This vehicle or wagon may be of a conventional type including generally a pair of rear wheels 41 and a pair of front steerable wheels 42. A wagon box 43 includes sideboards 44 and a wagon bottom 45. A movable apron 46, made of any suitable flexible material, is carried by the bottom 45 of the wagon. The apron 46 is provided with an unconnected end 47 which is positioned at the forward end of the wagon box 43.

As best shown in Figs. 1 and 2, the rear portion of the wagon is provided with a pair of rearwardly extending brackets 48 on which is carried for rotation a transversely extending rotatable shaft 49. The rotatable shaft 49 is provided with machine undercut end portions 50, the purpose of which will presently become more readily apparent. A winding drum 51 is carried and driven by the shaft 49, said winding drum being securely connected to the rearward end of the movable apron 46 for winding the same thereon. The movable apron 46 in effect provides the unloading mechanism for the wagon as will presently be more fully described.

Means for moving the apron is effected through a flexible drive structure 52. The flexible drive structure 52 comprises a flexible sheath 53 which encloses a flexible shaft 54. The flexible sheath 53 is provided at one end with a collar 55, as shown in Fig. 5, which extends into the tubular member 32. The collar 55 is held in place on said tubular member by means of a set-screw 56. A coupling member 57 extends into the sheath 53 and is rigidly secured by swaging or other fastening means to the flexible shaft 54. The coupling member 57 has a turned-down extension 58 which may be of a square end construction rigidly secured within a recess formed in the portion 35 of the end portion 35'. A spacer 59 encircles the end portion 35' of the shaft 35.

The sheath 53 extends upwardly to a rotary drive unit or speed reduction mechanism generally indicated by the reference character 60. The rotary drive unit consists of a casing 61 which may be formed of any rigid structure such as a casting or of welded parts. A coupling member 62 is rigidly secured to the end of the shaft 54. The coupling member 62 extends into the casing member 60 and is connected rigidly at its end to a pinion 63.

A transverse shaft 64 having an outwardly extending shaft extension 65 is journalled on the casing 61 by means of bearing ends 66 which are rigidly secured to said casing. A ratchet gear 67 is secured to rotate with the shaft 64 and as shown in Fig. 4, the hub of said ratchet gear may be welded to the shaft. Spaced in a parallel position with respect to the ratchet gear 67, is a gear 68 which is in driving engagement with the pinion 63. The pinion 68 includes a hub portion 69 which is loosely journaled on a bearing sleeve 70. As best shown in Figs. 3 and 4, a cam 71 is rigidly secured to the pinion 68 for rotation therewith, the cam 71 also being freely journaled on the bearing sleeve 70.

Figure 7:
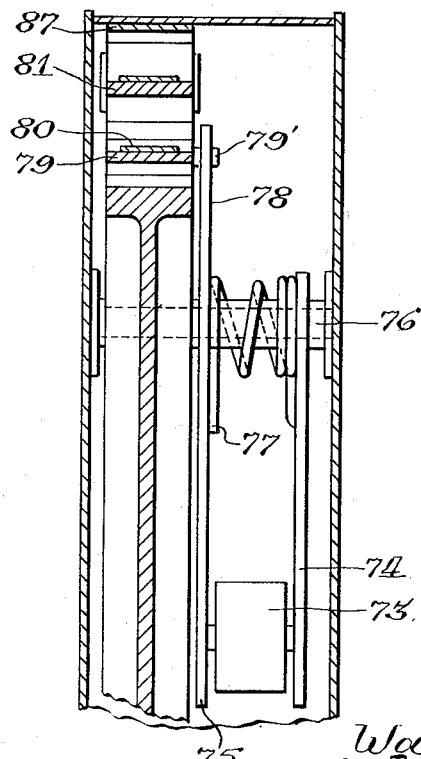
Fig. 7 is a sectional view through the rotary drive unit taken substantially along the line 7—7 of Fig. 3.

The cam 71 is provided with a cam surface 72, which, as shown in Fig. 3, is adapted to engage a roller or cam follower 73. The roller 73 is freely journaled between a pair of spaced arms 74 and 75. The spaced arms 74 and 75, as shown in Fig. 7, are journaled on a shaft 76, said shaft being connected at each end to the side walls of the casing 61. A spring 77 tends to urge the spaced arms 74 and 75 toward the cam 71, whereby the roller 73 is held in continuous engagement with the cam surface 72.

The arm 75 is provided with an upwardly extending portion 78. A driving pawl 79 is pivotally connected to a transversely extending shaft 79' which is rigidly secured to the extending portion 78. As best shown in Fig. 3 a leaf spring 80 normally tends to urge the driving pawl 79 into engagement with the teeth of the ratchet gear 67. A holding pawl 81 is normally held in engagement with the ratchet teeth by means of a spring 82. The holding pawl is pivotally connected to an adjusting screw 83 as best shown in Fig. 3.

As best shown in Figs. 1 and 2, the material handling mechanism or blower 11 is generally stationarily located near the silo or barn to which the material is to be delivered. The wagon or wheeled vehicle 40 is positioned adjacent the conveyor 18 so that the rearmost end of the wagon is substantially parallel to said conveyor. The material to be discharged from said vehicle is loaded upon the movable apron 46 as best shown in Fig. 2.

The flexible drive structure 52 is generally located and stationarily positioned with the blower 11 and the drive unit 60 is connected to the flexible sheath 53. When it is desired to unload the wagon the operator merely lifts up the rotary drive unit 60 and places the shaft 64 into alinement with the shaft 49 of the wheeled vehicle. When the shafts have been alined he merely slips one of the shaft extensions 65 over the square end 50 of the transverse shaft 49. The shaft extensions 65 are both formed square in cross section and therefore it can be appreciated that the shaft 64 is thus rigidly keyed in driving engagement with the shaft 49.

As best shown in Fig. 1, the wheeled vehicle 40 is also provided with a pair of transversely projecting stub shafts 84 which project outwardly from the wagon body. The stub shafts 84 are arranged to telescopically engage a projecting lug 85 rigidly formed at one end of the casing 61. The projecting lug 85 is provided with an opening 86. As the operator connects the shafts 64 and 49 in driving engagement with one another, he lines up the opening 86 in the projecting lug 85 with one of the stub shafts 84. By sliding the stub shaft 84 through the opening 86 the operator secures the rotary drive unit from rotating movement during the operation of the flexible drive shaft structure 52. Stated in another manner, the engaging portion of the shaft 84 with the lug 85 restrains the torque reaction of the rotary drive unit during operation. It can be appreciated that the rotary drive unit can readily be assembled or removed from the vehicle body by merely sliding the same laterally into or out of engagement with the transverse shaft 49 and the stub shaft 84.

After the operator has placed the rotary drive unit 60 into the driving engagement with the shaft 49, power to the flexible drive structure is effected by driving the belt 16. The pulley 36 is driven by the belt 37 whereupon the shaft 35 is effected to rotate the flexible shaft 54. As the flexible shaft 54 is driven the pinion 63 causes the gear 68 to rotate, whereupon the cam 71 also starts rotating. As the cam 71 rotates, the cam surface 72 is effective to engage the roller 73 thereby rocking the arms 74 and 75 about their pivotal points 76. As the arms 74 and 75 are thus rocked, the driving pawl 79 engages the ratchet teeth to effectuate counter-clockwise driving movement of the ratchet gear 67. As the ratchet gear 67 is driven the shaft 64 operates to rotate the shaft 49. The shaft 49 thereupon drives the winding drum 51 which causes the apron 46 to be wound thereon, said apron moving longitudinally with respect to the bottom of the wheeled vehicle.

As best shown in Fig. 2, the material to be discharged is thereupon moved rearwardly on the wagon bottom and is discharged from the rear of said wagon into the conveyor 18, whereupon the material is delivered into the blower for transportation to the silo or barn.

The speed of movement of the endless chains 21 is arranged to synchronize with the speed of movement of the movable apron 46. The speed of movement of the apron, by virtue of the flexible drive structure 52, is sufficient to keep the conveyor 18 loaded with material.

As best shown in Fig. 2, the upper end of the winding drum 51 is positioned considerably above or higher than the wagon bottom 45. Therefore it can be seen that the material to be discharged must first be moved upwardly over the top of the drum 51. This position of the winding drum is significant to the invention herein disclosed. As the material is moved rearwardly, the end of the load to be discharged is first moved upwardly over the winding drum, whereby portions of the load are broken-away from the mass which remains upon the movable apron 46. In other words, by positioning the winding drum at the position indicated, rearward movement of the apron 46 causes the material adjacent the winding drum to be broken-away from its mass, thereby breaking up the material in a desirable manner to assist in the discharge of the same.

It can be seen that a novel combination has been provided for supplying material from a movable vehicle to a material handling mechanism. By utilizing the flexible drive structure for unloading the wagon, an inexpensive and efficient mechanism is provided. The power means for the elevating mechanism can thus be utilized to also effectuate timed dumping action of the wheeled vehicle.

It is to be understood that modifications may be made which do not depart from the spirit of the invention as disclosed nor the scope thereof as defined in the appended claims.

What is claimed is:

1. In a material handling vehicle having a longitudinal body, a movable conveyor supported on the body, a rotatable member connected to the conveyor for moving the same, and a transversely extending shaft journalled on the body for rotatably supporting the rotatable member about a transverse axis; a drive structure for rotating said rotatable member comprising a portable casing, a drive shaft journalled for rotation on said casing, said drive shaft having first and second connecting portions projecting outwardly from opposite sides of the casing, a ratchet wheel within the casing, said wheel being connected to the drive shaft for rotating the same, a cam structure journalled on the drive shaft for relative rotational movement with respect thereto, a cam follower movably mounted within the casing, a drive pawl engageable with the ratchet wheel for moving the same, means connecting the cam follower with the pawl for reciprocating the same during movement of the cam thereby rotating the ratchet wheel and said drive shaft, means for rotating said cam including a flexible drive structure, said drive structure including a flexible shaft adapted to be connected at one end to a source of power, said shaft having a second end projecting into said casing, drive means on the second end of said flexible shaft engageable with the cam structure, a flexible sheath enclosing said drive shaft, and quick detachable means on the first and second connecting portions of the drive shaft whereby one of the connecting portions may be quickly connected to the shaft on the vehicle body for rotating said rotatable member and moving said conveyor to discharge material from the vehicle.

2. In a material handling vehicle having a longitudinal body, a movable conveyor supported on the body, and a rotatable member rotatably supported by the body and connected to the conveyor for moving the same; a drive structure for rotating the rotatable member comprising a portable casing, a drive shaft supported by the casing, a speed reduction mechanism within the casing, means connecting the speed reduction mechanism with the drive shaft for rotating the same, said drive shaft including first and second connecting portions projecting outwardly from opposite sides of the casing, means for driving the speed reduction mechanism including a flexible drive shaft having an end adapted to be connected to a source of power, means connecting a second end of said flexible shaft to the speed reduction mechanism, a flexible sheath enclosing said flexible shaft, and quick detachable means on the first and second connecting portions arranged and constructed whereby any one of said connecting portions may be quickly attached to the rotatable member for rotating the same on the vehicle body.

WALTER R. PETERSON.
ERWIN R. JOHNSON.

REFERENCES CITED

The following references are of record in the file of this patent:

UNITED STATES PATENTS

| Number | Name | Date |
|---|---|---|
| 1,785,594 | Paisley | Dec. 16, 1930 |
| 2,097,729 | Mall | Nov. 2, 1937 |
| 2,145,942 | McAdams et al. | Feb. 7, 1939 |
| 2,321,168 | Tognetti | June 8, 1943 |
| 2,340,983 | Pfeiffer et al. | Feb. 8, 1944 |
| 2,355,226 | Mallory | Aug. 8, 1944 |
| 2,410,996 | Patterson | Nov. 12, 1946 |
| 2,448,122 | Recker | Aug. 31, 1948 |